United States Patent [19]

Woodward

[11] 4,197,180
[45] Apr. 8, 1980

[54] SEPARATING SOLIDS FROM LIQUIDS

[75] Inventor: Dennis C. Woodward, Kenilworth, England

[73] Assignee: Courtaulds Limited, London, United Kingdom

[21] Appl. No.: 880,796

[22] Filed: Feb. 24, 1978

[30] Foreign Application Priority Data

Mar. 10, 1977 [GB] United Kingdom ............... 10102/77
Dec. 1, 1977 [GB] United Kingdom ............... 50044/77

[51] Int. Cl.² .............................................. C02C 5/12
[52] U.S. Cl. ................................... 204/275; 204/149; 204/152; 204/286; 204/294
[58] Field of Search ............... 204/149, 152, 280, 286, 204/290 R, 292, 294, 275

[56] References Cited

U.S. PATENT DOCUMENTS 3,944,478  3/1976  Kuji et al. ......................... 204/149 X
4,046,663  9/1977  Fleet et al. ........................ 204/149 X
4,046,664  9/1977  Fleet et al. ........................ 204/149 X Primary Examiner—Arthur C. Prescott
Attorney, Agent, or Firm—Davis, Hoxie, Faithfull & Hapgood

[57] ABSTRACT

In a process for the separation of solid particles from an aqueous liquid by electroflotation, at least one of the electrodes used is formed from carbon fibres. An apparatus for carrying out the separation comprises a tank containing an anode and a cathode, at least one of these electrodes being formed from carbon fibres. The tank has an inlet for the aqueous liquid containing solid particles and an outlet for clarified liquid and means for removing solid particles which have been carried upwardly in the tank. The electrodes preferably comprise carbon fibres set in an electrically-insulating matrix and having exposed ends of carbon fibres substantially throughout the length of the electrode.

14 Claims, 4 Drawing Figures

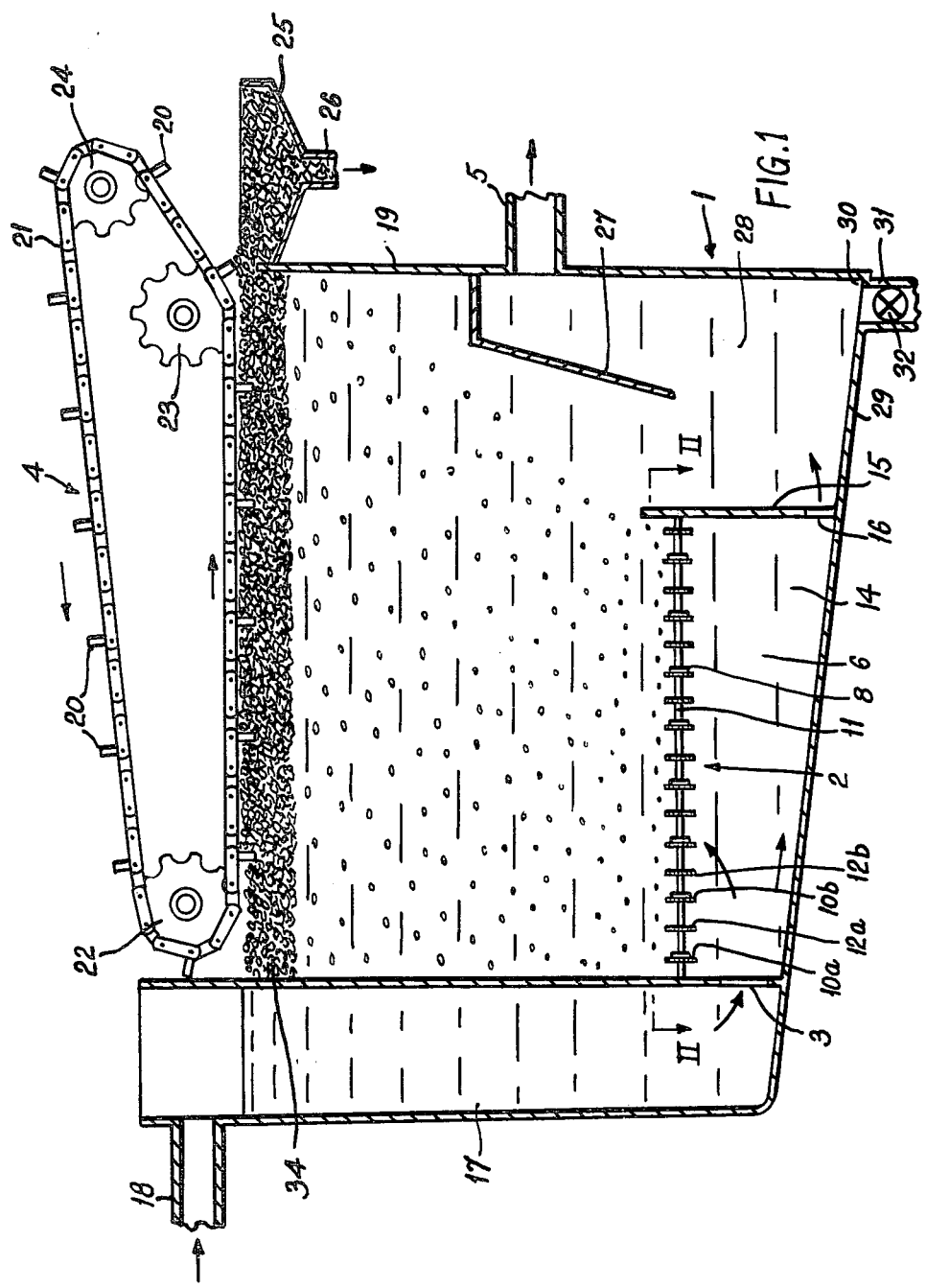

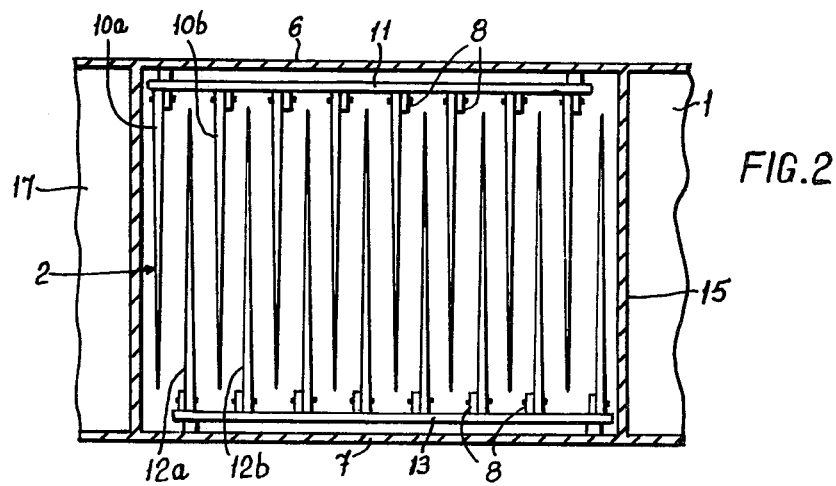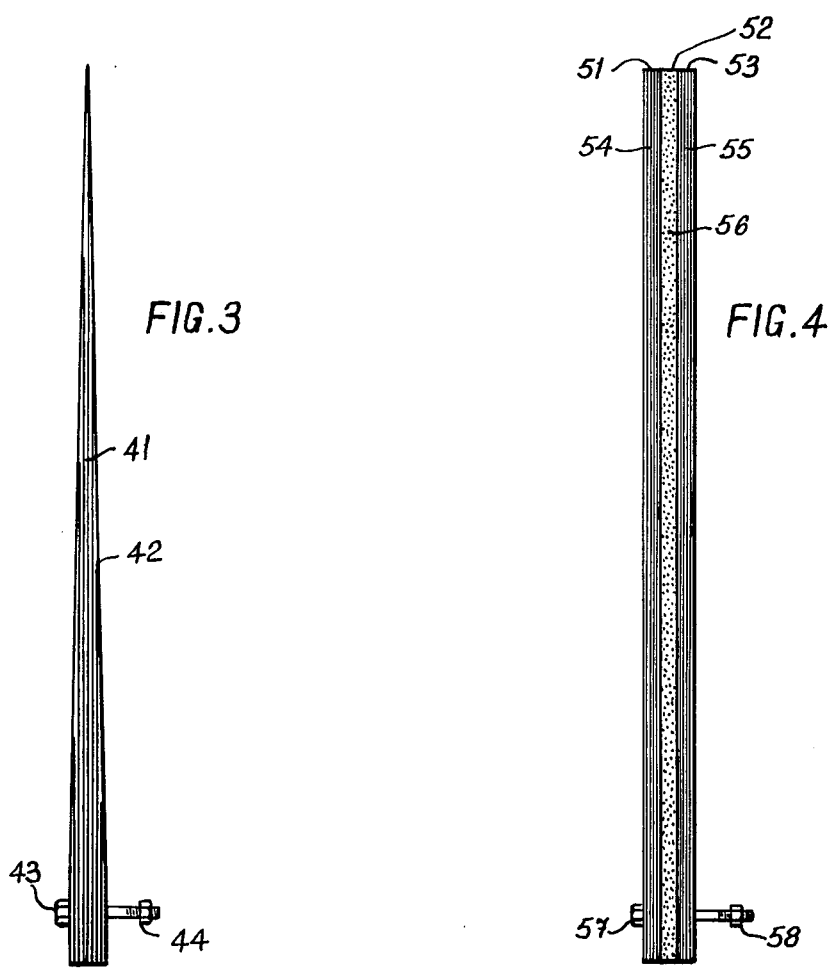

SEPARATING SOLIDS FROM LIQUIDS

This invention relates to the separation of solid particles from an aqueous liquid by electroflotation. In electroflotation the liquid to be treated is introduced below the liquid level in a tank containing electrodes. At least one of the electrodes is adapted to evolve a gas during electrolysis and the fine gas bubbles formed carry the dispersed solid particles to the top of the liquid. The scum or "float" formed is skimmed off and the clarified liquid is taken off at a lower level.

According to one aspect of the invention a process for the separation of solid particles from an aqueous liquid by electroflotation uses at least one electrode formed from carbon fibres.

According to a further aspect of the invention an apparatus for the separation of solid particles from an aqueous liquid by electroflotation comprises a tank containing an anode and a cathode, at least one of these electrodes being formed from carbon fibres, the tank having an inlet for the aqueous liquid containing solid particles and an outlet for clarified liquid, and means for removing solid particles which have been carried upwardly in the tank.

Since gas is evolved at both electrodes (oxygen gas at the anode and hydrogen gas at the cathode) it is preferred to form both electrodes from carbon fibres. The use of carbon fibres produces bubbles which are very finely dispersed across the tank and sufficient gas bubbles may be evolved using a lower current density than when conventional metallic electrodes are employed. Moreover, when both of the electrodes comprise carbon fibres, the current through the electroflotation cell can be occasionally reversed preventing any undesirable build-up of deposits at the cathode.

A preferred electrode for use in the invention, comprises carbon fibres set in an electrically-insulating matrix and having exposed ends of carbon fibres substantially throughout the length of the electrode, the said ends being electrically connected through the electrode to a terminal means.

The electrode is preferably in the form of a slat or rod having the terminal means at one end. The carbon fibres can be set in a thermosetting or cold-curing resin, for example an epoxy or unsaturated polyester resin, or in a thermoplastic resin, for example polypropylene or polyethylene, or in glass. The electrode preferably contains at least 25 percent by weight of carbon fibre, for example 40-65 percent. We have found that such electrodes are highly electrically conductive. Moreover, since the exposed ends of carbon fibres are separated one from another by being set in resin, very fine gas bubbles are produced giving efficient separation of very small solid particles.

One such preferred electrode is in the form of a slat with the carbon fibres extending longitudinally. The slat is tapered by machining, thus exposing carbon fibre ends all along the electrode whilst ensuring good electrical conduction to the fibre ends. The taper is preferably such that the smallest dimension of the slat decreases away from the end of the electrode having the terminal means; it can conveniently decrease to a point.

An alternative preferred electrode is in the form of a laminated slat having at least one layer in which the matrix contains carbon fibres extending longitudinally, for good electrical conductivity, and at least one layer in which the matrix contains carbon fibres extending across the electrode. The latter layer is preferably formed by cutting across the fibres to expose fiber ends.

Alternatively, the carbon fibre can be in the form of a fabric set in resin, for example a woven or knitted fabric, a tufted or pile fabric, or a non-woven fabric such as a needlefelt or a mat of chopped strands of carbon fibre. For example a slat of non-woven fabric set in resin can be cut or machined at one or both faces to expose ends of carbon fibres. A tufted fabric can be set in a sheet or slat of resin and then cut or machined across the tufts (parallel to the backing fabric) to expose ends of carbon fibres. A tufted fabric so used can have tufts or carbon fibres anchored in a backing fabric which is formed mainly from other fibres, but contains sufficient carbon fibres for conduction of electricity to the tufts.

Alternatively, resin containing carbon fibres can be abraded to reveal some of the carbon fibres, but it may be more difficult in this case to expose carbon fibres uniformly along the length of the electrode.

Alternatively, the slats can be moulded with carbon fibres at the surface of the resin or the carbon fibres can be in the form of tufts of carbon fibres anchored in a resin, alternate tufts being arranged as anode and cathode. In a further alternative, the carbon fibres can be unreinforced and retained within a permeable envelope, or can form the pile of a tufted or pile fabric, but these alternatives are not so efficient for producing fine bubbles.

Preferably, the carbon fibres used are those formed by high temperature carbonisation, for example carbonisation at a temperature of 2500° C. or above.

The electrodes are preferably arranged as a horizontal array of vertical or inclined interdigitated electrodes, the anodes and the cathodes being positioned alternately in the array. The inlet for the aqueous liquid containing solid particles is preferably below the carbon fibre electrode so that the liquid has to flow upwards past the electrode.

The array of electrodes preferably covers most of the area of the tank, although there should preferably be no flotation just under the outlet for clarified liquid. This liquid outlet is preferably shielded by a baffle with no electrodes in the portion of the tank between the outlet and the baffle.

Alternatively, the tank can have an upwardly-open, inner compartment submerged in the aqueous liquid to be treated, the inner compartment having an array of electrodes substantially across its area. The aqueous liquid containing solid particles is introduced into the inner compartment. The bubbles of gas with associated solid particles pass out of the top of the inner compartment then rise and spread out to form a float on the surface of the liquid in the tank.

Various means are known for removing the float from the surface of the liquid in the tank. An endless belt or chains can carry slats which move horizontally across the liquid surface continuously skimming off the float. Alternatively, a rotating arm can sweep across the liquid surface. This need not traverse the whole area of the tank; the layer of float gradually settles so that material from an area not swept by the rotating arm will move to the area which has been swept.

The tank can be shaped to have a low point, with means for withdrawing any solid material which has escaped the flotation process and which accumulates at the low point.

The process of the invention can be used to clarify various effluent liquids. It can be used to concentrate surplus activated sludge. It can also be used in protein recovery, where a dispersion containing up to 1000 parts per million solid protein can be treated by electroflotation to give a solid scum containing 8 percent solids. The solids concentration obtained by electroflotation is considerably higher than that of a precipitate obtained by settling.

The invention will now be described by way of example with reference to the accompanying diagrammatic drawings, in which FIG. 1 is a sectional side elevation of an apparatus according to the invention, FIG. 2 is a sectional plan taken on the line II—II of FIG. 1, FIG. 3 is a plan, on a much larger scale, of one of the electrodes of the apparatus of FIGS. 1 and 2, and FIG. 4 is a side elevation, on a scale comparable with that of FIG. 3, of an alternative form of electrode for use in the apparatus of FIGS. 1 and 2.

The apparatus shown in FIGS. 1 and 2 comprises generally a tank 1 having an array of electrodes 2, an inlet 3, means 4 for removing solid particles which have been carried upwardly in the tank and an outlet 5 for clarified liquid.

The array of electrodes 2 comprises anodes 10a, 10b etc. supported by and electrically connected through a bar 11 mounted on, and electrically insulated from, one side wall 6 of the tank 1, and cathodes 12a, 12b etc. supported by and electrically connected through a bar 13 mounted on, and electrically-insulated from, the side wall 7 of the tank which is opposite to the wall 6. The array of electrodes 2 is within a compartment 14 of tank 1 enclosed by a divider 15. The compartment 14 is open at the top but has a narrower lower outlet 16 for liquid.

FIG. 3 shows a preferred form of electrode for use as the anodes 10 and/or the cathodes 12. The electrode comprises carbon fibre, shown diagrammatically for example as 41 extending along the electrode and set in resin. A bolt 43 and nut 44 adjacent to one end of the electrode serve as terminal means to connect the electrode electrically to the bar 11 or 13 in the apparatus of FIGS. 1 and 2. For example, the bolts 43 may serve to connect the electrodes to lugs 8 secured to the bars 11 and 13. The electrode is tapered at least from the region of the bolt 43 to the end of the electrode remote from the bolt, so that carbon fibre ends reach the surface of the electrode substantially all along its length, for example at 42.

FIG. 4 shows an alternative form of electrode for use as the anodes 10 and/or the cathodes 12. The electrode comprises three layers 51, 52 and 53 of carbon fibres set in resin. In the outside layers 51 and 53 the carbon fibres, shown diagrammatically for example as 54 and 55, extend along the electrode and give good electrical conductivity along the electrode. In the middle layer 52 the carbon fibres are arranged perpendicularly to those in the layers 51 and 53, so that there are exposed carbon fibre ends at the surface of the middle layer 52 all along its length, for example at 56. A bolt 57 and nut 58 serve as a terminal means to connect the electrode electrically to the bar 11 or 13 in the apparatus of FIGS. 1 and 2. For example, the bolts 57 may pass through vertical holes (not shown) formed in the bars 11 and 13.

The electrodes of FIGS. 3 and 4 can conveniently be 40 to 1000 mm long, 4 to 50 mm wide and 0.4 to 15 mm thick (measured at the widest point of the electrode of FIG. 3).

A feed chamber 17 is attached to the tank 1. A pipe 18 feeds liquid to be treated to chamber 17, and chamber 17 feeds inlet 3. The inlet 3 is preferably in the form of a series of inlet ports disposed across the entire width of the tank.

The means 4 for removing solid particles which have been carried to the surface of the liquid in the tank 1 comprises a number of slats such as 20. The slats 20 are carried by two, spaced-apart endless chains 21 (only one of which can be seen in FIG. 1) mounted on sprockets 22, 23 and 24, the sprocket 24 being a driven sprocket and the other two idler sprockets. The lower flights of the chains between the sprockets 22 and 23 are substantially horizontal. The chains and slats 20 move upwards between the sprockets 23 and 24 and a receiving vessel 25, secured to the external surface of the wall 19 of the tank, is positioned beneath these upwardly-moving flights of the chains. Vessel 25 has an outlet 26 at its lowest point.

The outlet 5 for clarified liquid is shielded by a baffle 27 which projects inwardly from the tank wall 19 then downwardly between the wall 19 and the divider 15 into a portion 28 of the tank.

The floor 29 of the tank 1 slopes down to a low point 30, where an outlet 31 controlled by a valve 32 is situated.

In use of the above-described apparatus, liquid containing solid particles is fed via chamber 17 and inlet 3 to the compartment 14. The direction of flow from the inlet 3 is arranged to be just upwards of horizontal.

Bubbles of gas are generated at the electrodes 2 and the solid particles become associated with the gas bubbles and are carried upwardly in the tank to form a float 34. Liquid flows out of compartment 14 into the portion 28 of the tank both through outlet 16 and over the top of divider 15. The flow of liquid tends to carry the gas bubbles along the tank, so that the float 34 readily extends over the entire surface of the liquid in the tank. It is skimmed off by the slats 20 into the vessel 25 and is removed through the outlet 26.

Clarified liquid flows out through the outlet 5. Any solid material not carried upwards to float 34 and accumulating at the low point 30 can occasionally be removed through the outlet 31.

The spacing between an electrode 10 and an adjacent electrode 11 can for example be 2 to 5 centimeters. The current densities used are generally in the range 10–100 amps per square meter, for example 20–35 amps per square meter. It is preferred to operate at 12 volts or less, for example 3 to 6 volts.

What is claimed is:

1. An apparatus for the separation of solid particles from an aqueous liquid by electroflotation comprising a tank containing an anode and a cathode formed from carbon fibres, the tank having an inlet for the aqueous liquid containing solid particles and an outlet for clarified liquid, and means for removing solid particles which have been carried upwardly in the tank.

2. An apparatus for the separation of solid particles from an aqueous liquid by electroflotation comprising a tank containing an anode and a cathode, at least one of these electrodes being formed from carbon fibres set in an elongate electrically insulating matrix and having exposed ends of carbon fibres substantially throughout the length of the matrix, the said ends being electrically connected through the matrix to a terminal means at or adjacent to one end of the electrode, the tank having an inlet for the aqueous liquid containing solid particles and an outlet for clarified liquid and means for removing solid particles which have been carried upwardly in the tank.

3. An apparatus according to claim 1 in which both the anode and the cathode are formed from carbon fibres.

4. An apparatus according to claim 2 in which the matrix is made of a material chosen from the group consisting of thermosetting resin, cold-curing resin, thermoplastic resin and glass.

5. An apparatus according to claim 2 in which the electrode contains from 40 to 65 percent by weight of carbon fibres.

6. An apparatus according to claim 2 in which the electrode is in the form of an elongate slat containing longitudinally extending carbon fibres, the slat being tapered by machining.

7. An apparatus according to claim 6 in which the slat is tapered so that its cross-sectional area decreases in the direction away from said one end of the electrode.

8. An apparatus according to claim 2 in which the electrode is in the form of an elongate laminated slat having at least one layer in which the matrix contains carbon fibres extending longitudinally and at least one layer in which the matrix contains carbon fibres extending across the electrode.

9. An apparatus according to claim 2 in which the electrodes are arranged as a horizontal array of interdigitated electrodes, the anodes and the cathodes being positioned alternately in the array.

10. An apparatus according to claim 2 in which the inlet for the aqueous liquid containing solid particles is below the electrode formed from carbon fibres.

11. An apparatus according to claim 2 in which the outlet for clarified liquid is shielded by a baffle and there is no electrode in the portion of the tank between the outlet and the baffle.

12. An apparatus according to claim 2 in which the tank has an upwardly-open inner compartment submerged in the aqueous liquid to be treated, the inner compartment having an array of electrodes substantially across its area, and the inlet for the aqueous liquid containing solid particles introduces the aqueous liquid into the inner compartment.

13. An apparatus according to claim 2 in which the electrode comprises a slat of non-woven carbon fibre fabric set in the matrix and cut or machined at one face to expose ends of carbon fibres.

14. An apparatus according to claim 2 in which the electrode comprises a tufted fabric having tufts of carbon fibres anchored in an electrically conductive backing fabric, the tufted fabric being set in a sheet of the matrix and cut or machined across the tufts.

* * * * *